Sept. 12, 1933.   L. BIEDERMAN ET AL   1,926,966
PEDAL
Filed April 22, 1932
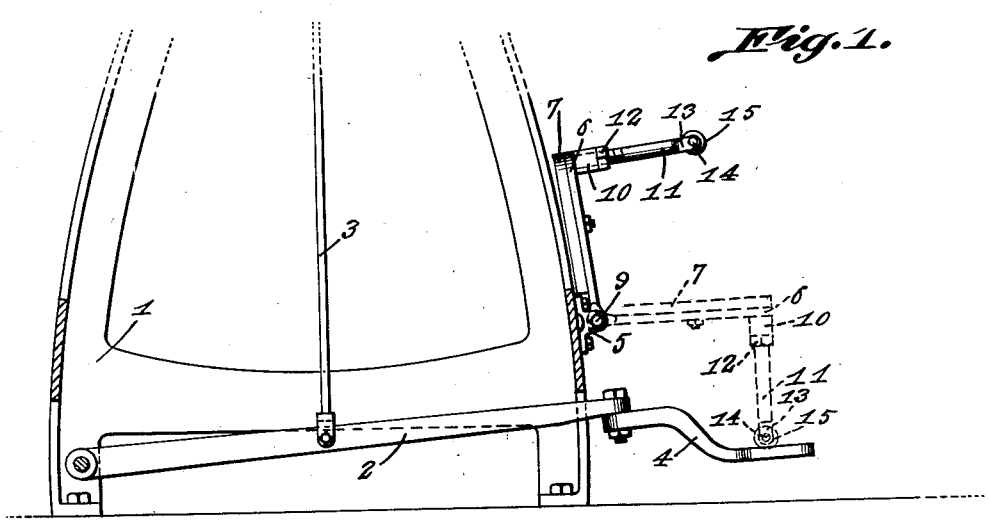
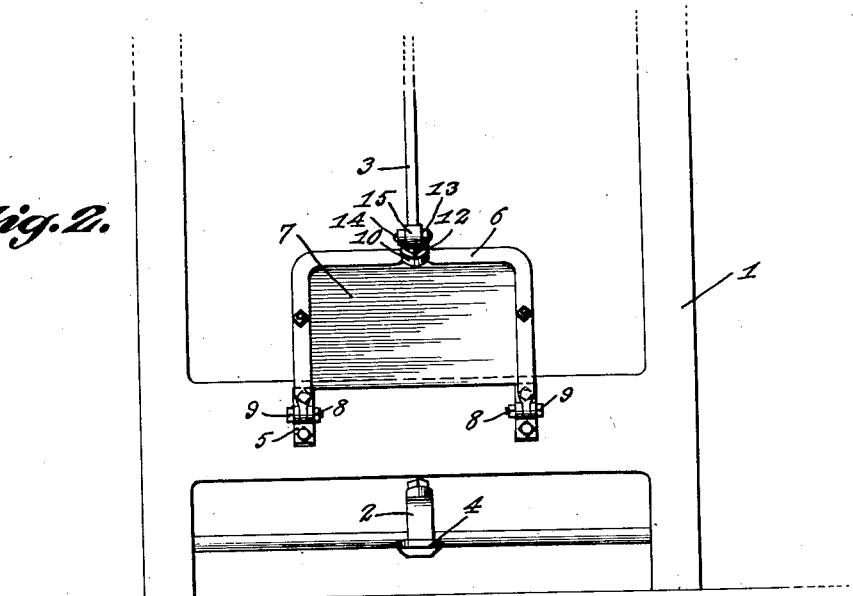
Lazarus Biederman
Elmer Betterly, INVENTORS
BY Victor J. Evans & Co.
ATTORNEY Patented Sept. 12, 1933

1,926,966

UNITED STATES PATENT OFFICE 1,926,966

PEDAL

Lazarus Biederman and Elmer Betterly, Hazleton, Pa.

Application April 22, 1932. Serial No. 606,922

1 Claim. (Cl. 74—81)

As is well known certain machinery employed in manufacturing plants or mills are pedal-operated. The pedals of such machines are located close to the floor so that it is necessary that the operator assume a standing position in operating the machine. The pedals cannot be elevated to permit of the operator assuming a sitting position as this would require the entire reconstruction of a machine or rather the rearrangement of parts which cooperate in producing the desired result. The operators of these types of machines are mostly women or young girls and the period of working them in most mills or plants is of nine hour duration. The operator is, therefore, forced to assume a standing position for this length of time and employs one of her feet in operating the pedal and her hands in placing and removing the goods from the machine. Also with these types of machinery it is awkward for the operator to actuate the pedal except by either her right or left foot, as the shifting of her feet would place her in a position whereby the goods fed to and removed from the machine cannot be readily handled. The work of the operator is, therefore, strenuous and the operator is therefore much fatigued after a day's labor. The object of our invention is, therefore, to provide an elevated and what may be termed an auxiliary foot pedal designed to engage with the main operating pedal of the type of machines mentioned which will not only permit of the operator performing her duty in a seated and, therefore, more comfortable position but which will also permit of both of the feet of the operator being placed upon the said elevated auxiliary pedal.

To the attainment of the foregoing the invention consists in the improvement hereinafter described and definitely claimed.

In the drawing:

Figure 1 is a side elevation of a foot pedal operated machine with our improvement attached thereto, parts being in section.

Figure 2 is a front elevation thereof, the elevated and auxiliary pedal being in raised position.

In the drawing the main frame of a foot pedal operated machine is indicated by the numeral 1. A pivoted lever 2 is arranged at the bottom of the machine and to which lever the actuating rod 3 for the machine is pivoted. The lever has pivotally secured on its outer end a foot pedal 4. The foot pedal it will be noted is disposed in close relation to the bottom of the frame and likewise in close relation to the floor of the mill to which the frame is bolted. On the front of the frame, directly above the slot or opening provided therein for the end of the lever 2 and the swingable foot pedal 4 we hingedly secure, as at 5, the parallel arms of a substantially U-shaped frame 6 and to this frame we bolt or otherwise secure a foot plate or board 7. The bolts which are engaged by nuts afford the pivot for the hinges 5, and nuts 8 may be screwed on the pivot bolts 9 to afford a frictional engagement and whereby the elevated and auxiliary foot pedal may be swung and sustained against the face or front of the frame 1. A cable or like element, illustrated by the dotted line in Figure 2 of the drawing may be employed for holding the auxiliary pedal elevated. On the under face of the frame 6, at the outer portion and preferably at the center thereof there is provided a socket 10 for a leg or post 11. The post 11 is screwed in the socket and is retained adjusted through the medium of a nut 12 which is screwed on the said leg and which contacts with the outer face of the socket. The lower or outer end of the leg 11 is bifurcated, as at 13, and pivotally secured, as at 14, between the arms afforded by the said bifurcation there is a roller 15, and this roller when the device is swung to operative position is designed to rest on the foot pedal 4 so that the auxiliary pedal is afforded a swinging movement when pressure is exerted thereagainst and which pressure will operate the pedal 4 to cause the downward swinging of the lever 2 and the downward movement of the rod 3 which is connected with the operating parts of the machine. Spring means of the ordinary character is employed for returning the rod, lever and pedal to initial positions and such means also raises the auxiliary pedal.

The auxiliary pedal is of such size as to permit of both feet of the operator resting thereon and is arranged upon the frame 1 at such elevation as to permit of the operator being seated when operating the machine.

It is believed that the construction and advantages of our improved device will be understood and appreciated by those skilled in the art to which the invention relates after the foregoing description has been carefully read in connection with the accompanying drawing so that further detailed description will not be required.

Having described the invention, we claim:

An auxiliary and elevated pedal for a pedal actuated machine comprising a substantially U-shaped frame, hinges connecting the ends of the frame to a machine above a foot control pedal on said machine, a substantially rectangular shaped plate fixed on the upper face of the frame and substantially closing the latter to provide a compartively large tread surface for a person's foot to engage, a threaded socket formed on the frame intermediate the ends of the latter and depending from said frame, a leg threaded in said socket, a binding nut threaded to said leg and arranged in contact with the socket, and a roller journaled to the free end of the leg for contacting with the foot pedal when the frame is swung into an operative position.

LAZARUS BIEDERMAN.
ELMER BETTERLY.